United States Patent [19]

Schlüter et al.

[11] Patent Number: 5,187,221
[45] Date of Patent: Feb. 16, 1993

[54] STYRENE/BUTADIENE GRAFT COPOLYMER LATEX AND HEAT-VULCANIZABLE COMPOSITION, CONTAINING THE LATTER AS REINFORCING LATEX, FOR THE PRODUCTION OF LATEX FOAM

[75] Inventors: Herbert Schlüter, Marl; Herbert Knipp, Haltern; Alfred Wieland, Marl, all of Fed. Rep. of Germany

[73] Assignee: Chemische Werke Huels Aktiengesellschaft, Marl, Fed. Rep. of Germany

[21] Appl. No.: 147,080

[22] Filed: Jan. 20, 1988

Related U.S. Application Data

[63] Continuation of Ser. No. 813,733, Dec. 27, 1985, abandoned.

[30] Foreign Application Priority Data

Dec. 28, 1984 [DE] Fed. Rep. of Germany ....... 3447585

[51] Int. Cl.$^5$ .............................................. C08L 9/08
[52] U.S. Cl. .................................... 524/461; 523/201; 525/316; 525/902; 521/71
[58] Field of Search ......................... 524/461; 523/201; 525/316, 902; 521/71

[56] References Cited

U.S. PATENT DOCUMENTS

| 2,962,465 | 11/1960 | Lindstrom et al. | 524/823 |
|---|---|---|---|
| 3,296,176 | 1/1967 | Fantl | 523/201 |
| 3,917,748 | 11/1975 | Vincent, Jr. et al. | 524/461 |
| 4,134,872 | 1/1979 | Lee . | |
| 4,150,004 | 4/1979 | Schleeter | 524/745 |
| 4,265,977 | 5/1981 | Kawamura et al. | 523/201 |
| 4,325,856 | 4/1982 | Ishikawa et al. | 523/201 |
| 4,413,068 | 11/1983 | Sinclair et al. | 523/201 |
| 4,497,917 | 2/1985 | Upson et al. | 523/201 |
| 4,515,914 | 5/1985 | Tsurumi et al. | 523/201 |
| 4,537,916 | 8/1985 | Bruschtein et al. | 523/201 |

FOREIGN PATENT DOCUMENTS

| 8502406 | 6/1985 | European Pat. Off. | 525/316 |
|---|---|---|---|
| 2455726 | 6/1975 | Fed. Rep. of Germany | 525/316 |
| 0203551 | 10/1983 | Fed. Rep. of Germany | 525/316 |
| 491476 | 1/1974 | Japan | 525/316 |
| 54-131013 | 10/1979 | Japan | 523/201 |
| 54-151606 | 11/1979 | Japan | 523/201 |
| 57-30713 | 2/1982 | Japan | 525/316 |
| 840153 | 7/1960 | United Kingdom | 525/316 |
| 1040287 | 8/1966 | United Kingdom | 525/316 |

OTHER PUBLICATIONS

"Emulsionspolymerisation und Kunststoff-Latices"; Fikentscher et al. (Translation).

Primary Examiner—Joseph L. Schofer
Assistant Examiner—N. Sarafim
Attorney, Agent, or Firm—Millen, White, Zelano and Branigan

[57] ABSTRACT

A stryene/butadiene graft copolymer latex has a graft substrate component with a comparatively high content of repeating units obtained by polymerization of styrene. The graft copolymer exhibits correspondingly comparatively hard and soft regions with a high and a low Tg, respectively.

Vulcanizable compositions based thereon can be used for production of latex foams distinguished by a low compression set in a temperature range from 20° to 70° C., a high tensile strength, and a high elongation at break, and by a high compression resistance.

4 Claims, No Drawings

STYRENE/BUTADIENE GRAFT COPOLYMER LATEX AND HEAT-VULCANIZABLE COMPOSITION, CONTAINING THE LATTER AS REINFORCING LATEX, FOR THE PRODUCTION OF LATEX FOAM

This application is a continuation of application Ser. No. 813,733, filed Dec. 27, 1985 now abandoned.

BACKGROUND OF THE INVENTION

Latex foam is normally produced according to the state of the art by expanding a heat-vulcanizable composition, e.g., as generally defined below, with air or another gas, combining the composition with a gelling agent, such as sodium silicofluoride for example, and then vulcanizing the mixture by heat (German Patent 1,056,364; DOS 1,470,810). Gelling takes place at room temperature, in an infrared treatment zone, or in the heating-up phase for vulcanization. In the non-gel method, special measures for gelling are omitted. The thus-produced latex foam has a cellular structure.

Latex foam must exhibit a spectrum of good properties which can be described by the following combination of characteristics:

(a) high elasticity in a temperature range from 20° to 70° C., i.e. in this temperature range, after a relatively long compression period, the compression set is to be as low as possible (DIN 53,572);

(b) high tensile strength and high elongation at break (DIN 53,571); and (c) the foam density, with a given indentation hardness, is to be as low as possible (DIN 53,576, economy); in other words with a predetermined foam density, the indentation hardness (compression resistance) is to be at a maximum.

The above-described combination of properties is only inadequately realized by the state of the art. Such foams are especially useful in production of mattresses and upholstery.

SUMMARY OF THE INVENTION

It is thus an object of this invention to provide a heat-vulcanizable composition for the production of latex foam and a reinforcing latex suitable for this purpose.

It is another object to provide a corresponding foam attaining the above-mentioned combination of properties more satisfactorily than the state of the art.

Upon further study of the specification and appended claims, further objects and advantages of this invention will become apparent to those skilled in the art.

These objects have been attained in a surprising way by providing styrene/butadiene graft copolymer latices, characterized by the following features:

a. they are obtained by semicontinuous emulsion polymerization in the presence of 1-6, especially 3-5% by weight of a conventional fat soap and/or resin soap as the emulsifier and $\leq 0.3$, especially $\leq 0.2\%$ by weight of a conventional compound regulating the molecular weight of the polymer, based in each case on the entire amount of all monomers used to prepare the latex;

b. the graft copolymer (A) comprises 35-65% (preferably 45-60%) by weight of a graft substrate (A1) (which latter, in turn, can comprise a graft substrate (B1) and grafted-on proportion (B2)), and 35-65% (preferably 40-55%) by weight of a grafted-on proportion (A2) (i.e. grafted-on in the last stage overall);

c.1 the graft substrate (A1) is obtained in one stage; it comprises 86-95% (preferably 87-93%) by weight of repeating units obtained by polymerization of styrene in the presence of 1,3-butadiene (styrene units), and 5-14% (preferably 7-13%) by weight of repeating units obtained by polymerization of 1,3-butadiene in the presence of styrene (1,3-butadiene units);

c.2 the graft substrate (A1) is obtained, as an alternative to c.1, in two stages as graft substrate B1 with grafted-on proportion B2; in the first stage, a polystyrene nucleating latex is obtained, as graft substrate B1; its solids are 1-20, especially 5-15% by weight, based on the final amount of graft copolymer A present at the end of the last stage; the grafted-on proportion (B2) grafted onto graft substrate (B1) in the second stage comprises 86-95 % (preferably 87-93%) by weight of repeating units obtained by polymerization of styrene in the presence of 1,3-butadiene (styrene units), and 5-14% (preferably 7-13%) by weight of repeating units obtained by polymerization of 1,3-butadiene in the presence of styrene (1,3-butadiene units); intensive agitation is performed while feeding the emulsifier during the grafting process in order to avoid formation of new particles;

d. the proportion of the graft copolymer grafted on (in the last stage, A2) comprises 62-70% (preferably 65-69%) by weight of repeating units obtained by polymerization of styrene in the presence of 1,3-butadiene (styrene units), and 30-38% (preferably 31-35%) by weight of repeating units obtained by polymerization of 1,3-butadiene in the presence of styrene (1,3-butadiene units); intensive agitation is carried out while feeding the emulsifier during the grafting process in order to avoid formation of new particles;

e. the graft copolymer (A) is present in the disperse phase of the latex; the latter, on account of features b through d, has comparatively hard and soft zones with a comparatively high and low glass transition temperature (Tg), respectively, in the individual particles, and has an average particle diameter of 120-300 (preferably 150-250)nm, determined by surface titration (soap titration).

These objects have also been attained by providing heat-vulcanizable compositions for the production of latex foam, comprising a reinforced elastomer component, an effective amount of a vulcanizing agent, and conventional additives;

the reinforced elastomer component exhibiting the following properties:

1 it is obtained by the following measures:

1.1 an elastomer latex is mixed with a reinforcing latex (a latex of a reinforcing polymer; solids: 2-30 (preferably 5-25) parts by weight per hundred parts total (phr));

1.2 the mixture of latices is concentrated to a solids content of $\geq 55\%$ (preferably $\geq 60\%$) by weight;

2 the elastomer latex is an NR latex or an SBR latex which latter has been subjected to measures effecting agglomeration of the elastomer particles, or it is a mixture of an NR latex and an SBR latex which latter has been subjected to measures effecting agglomeration of the elastomer particles;

3 the SBR latex is not carboxylated; it has been obtained by emulsion polymerization in the presence of a conventional fat soap and/or resin soap as emulsifier; the SBR contains 15-35% (preferably 20-30%) by weight of repeating units obtained by polymerization of styrene (styrene units);

4 the reinforced elastomer component, at a solids content of 68% by weight, has a viscosity of $\leq 2,500$ (preferably $\leq 2000$) mPa·s, determined in a Brookfield viscosimeter (spindle III, 30 rpm, 20° C.);

the vulcanizable composition being characterized by the following feature:

j. the reinforcing latex is a styrene/butadiene graft copolymer latex of this invention as described above.

DETAILED DESCRIPTION

The semicontinuous emulsion polymerization for preparing the styrene/butadiene graft copolymer latex is basically conventional (see, for example, U.S. Pat. Nos. 2,962,465 and 4,134,872 which disclosures are incorporated by reference herein).

The styrene/butadiene graft copolymer particles of the reinforcing latex of this invention can be described in a simplified way as follows: They comprise a comparatively hard core (higher styrene content in the graft substrate) and a comparatively soft shell (lesser styrene content in the grafted-on proportion). This hardness and softness correspond to a comparatively high Tg and low Tg, respectively.

Soap titration for determining the average diameter of the styrene/butadiene graft copolymer particles is conventional and the values are based on the methodology described in J. Paint Techn. 47:41 (1975), right-hand column, last paragraph et seq.

Suitable measures for agglomeration of the elastomer particles of SBR latex are also known (see, for example, German Patents 1,213,984 and 2,645,082). The degree of agglomeration is selected such as to correspond to feature 4.

Vulcanizing agents mentioned here are understood to include the conventional vulcanization systems. A preferred vulcanization system contains sulfur in combination with the usual accelerators. The amount of vulcanizing agent depends on the type and amounts of other mixture components and can be readily determined conventionally by simple orientation experiments.

Conventional non-limiting additives include, for example, fat soaps and resin soaps (which can be present in the reinforced elastomer component in conventional amounts sufficient for further processing of the vulcanizable composition), antiaging and light-protection agents, thickeners, e.g. carboxymethylcellulose, and fillers, for example, chalk, kaolin, amylose etc. All amounts are chosen conventionally.

Non-limiting examples of conventional emulsifiers for step (a) above include watersoluble soaps of soap forming monocarboxylic acids such as the sodium-, potassium- and ammoniumsalts of $C_{10-24}$ fatty acids and of resin acids including hydrogenated, dehydrogenated and disproportionated resin acids.

Non-limiting examples of conventional molecular weight regulators include $C_{12-14}$-alkyl mercaptans.

The intensive agitation utilized in feeding emulsifier to avoid forming new particles in the latex is also conventional.

Throughout the foregoing, unless indicated otherwise herein, all details of the latices and vulcanizable compositions of this invention and their preparation and use are fully conventional, including but not limited to, the types and amounts of vulcanizing agents, additives, emulsifiers, regulators etc., the compositions and preparation of NR and/or SBR latices, the details of varying particle sizes and solids contents in latices, etc., e.g., as described in Noble, Latex in Industry, 6. ed. (1953), Rubber Age, N.Y., which disclosures are incorporated by reference herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the preceding text and the following examples, all temperatures are set forth uncorrected in degrees Celsius and all parts and percentages are by weight, unless otherwise indicated.

The comparative examples not in accordance with the invention are denoted by capital letters.

The average particle diameters of the latices described below were determined as indicated above. The viscosities of the reinforced elastomer components were determined in a Brookfield viscosimeter (spindle III, 30 rpm, 20° C.).

Production of Reinforcing Latices 1 and A-C

Example 1

Styrene/Butadiene Graft Copolymer Latex of Invention

In a polymerization reactor, an emulsion of 84 p fully demineralized water, 0.2 p potassium oleate (solid, present as a 17% strength aqueous solution), 0.1 p potassium carbonate, 0.015 p tetrasodium salt of ethylenediaminetetraactic acid, 10 p styrene and 0.15 p ammonium persulfate was heated to 70° C. during a period of 1-2 hours. During this step, a polystyrene nucleating latex was obtained having an average particle diameter of 40 nm.

At 75° C., the following streams were added to this batch:

(1) A mixture of 19 p fully demineralized water and 4 p potassium oleate (solid, present as a 17% strength aqueous solution); feeding period: 5 hours (constant flow velocity).

(2) A solution of 1.35 p ammonium persulfate in 6 p fully demineralized water; feeding period: 6 hours (constant flow velocity).

(3) A mixture of 45 p styrene/1,3-butadiene (weight ratio: 89/11) and 0.06 p tert-dodecyl mercaptan; feeding period: 2.5 hours (constant flow velocity).

(4) A mixture of 45 p styrene/1,3-butadiene (weight ratio: 67/33) and 0.09 p tert-dodecyl mercaptan; feeding period: 2.5 hours (constant flow velocity).

Feeding of streams (1)-(3) was begun simultaneously. After 2.5 hours (end of the first grafting stage), stream (4) was commenced.

The styrene/butadiene graft copolymer latex obtained after termination of the second grafting stage had a solids content of about 50% and an average particle diameter of 220 nm.

EXAMPLE A

Styrene/Butadiene Graft Copolymer Latex

This example corresponds to Example 1 regarding the weight ratio of the monomers utilized in total (styrene/1,3-butadiene=80/20) and with respect to the remaining production parameters; however, streams (3) and (4) were replaced by the following stream:

(3) A mixture of 90 p styrene/1,3-butadiene (weight ratio: 70/20) and 0.15 p tert-dodecyl mercaptan; feeding period: 5 hours (constant flow velocity).

Feeding of streams (1)–(3) was commenced simultaneously.

The styrene/butadiene graft copolymer latex obtained after termination of the grafting stage had a solids content of about 50% and an average particle diameter of 200 nm.

EXAMPLE B

Styrene/Butadiene Graft Copolymer Latex

This example corresponds to Example 1; however, stream (4) was replaced by the following stream:

(4) A mixture of 45 p styrene/1,3-butadiene (weight ratio 72/28) and 0.09 p tert-dodecyl mercaptan; feeding period: 2.5 hours (constant flow velocity).

The styrene/butadiene graft copolymer latex produced after termination of the second grafting stage exhibited a solids content of about 50% and an average particle diameter of 210 nm.

EXAMPLE C

Polystyrene Latex

This example corresponds to Example 1; however, streams (3) and (4) were replaced by the following stream:

(3) A mixture of 90 p styrene and 0.15 p tertdodecyl mercaptan; feeding period: 5 hours (constant flow velocity).

Feeding of streams (1)–(3) was commenced simultaneously.

The polystyrene latex obtained after polymerization was finished had a solids content of about 50% and an average particle diameter of 200 nm.

Production of SBR Latex

The latex was prepared conventionally by redox polymerization with the following formulation:

120 p fully demineralized water
2.7 p potassium oleate (calculated as 100% strength)
0.5 p of a condensation product from formaldehyde and naphthalenesulfonic acid
0.29 p potassium chloride
31 p styrene
69 p 1,3-butadiene After a 65% conversion of the monomers, polymerization was stopped. The resultant SBR latex was subjected to the steps indicated in German Patent 1,213,984 for agglomeration of the elastomer particles. The average particle diameter was thereafter 240 nm. The residual monomers were separated conventionally. The polymer contained 26% repeating units obtained by polymerization of styrene (styrene units, IR analysis).

Preparation of Reinforced Elastomer Components 1 and A-C

The SBR latex was mixed respectively with one of reinforcing latices 1 and A-C (solids: 20 p phr). The thus-obtained mixture of latices was concentrated respectively to a solids content of 70%.

With a solids content of 68%, the reinforced elastomer components had the following viscosities:

| 1: 1,400 mPa · s; | | A: 1,200 mPa · s; |
| B: 1,300 mPa · s; | and | C: 1,350 mPa · s. |

Production of Vulcanizable Compositions 1 and A-C and Latex Foams (Test Specimens) 1 and A-C The vulcanizable compositions were produced according to the following formulation (solids):

100 p of one of the reinforced elastomer components 1 and A-C
0.5 p potassium oleate (added as a 17% strength aqueous solution)
0.25 p carboxymethylcellulose (added as a 2.5% strength aqueous solution)

Prior to expansion, the vulcanizable compositions were finished up by the addition of a 50% strength aqueous dispersion of the following vulcanizing system (solids):

2 p sulfur
1 p zinc diethyldithiocarbamate
1 p zinc 2-mercaptobenzothiazole
1 p diphenylguanidine
3 p zinc oxide
0.5 p potassium oleate (added as a 17% strength aqueous solution)
1 p antioxidant By means of a whisked-foam producing machine, air was whipped into the vulcanizable compositions. The resultant wet foams (foam density: about 130 g/l) were respectively combined with 2 p sodium silicofluoride, present as a 25% strength aqueous solution, and poured into heatable molds. By gelling in the heating-up phase and subsequent vulcanizing at 100° C./30 min, the latex foams 1 and A-C were obtained. They were washed with water, dried at 75° C./16 h (foam density: 100 g/l), and characterized as indicated in the table below.

TABLE

Characterization of Latex Foams (Test Specimens) 1 and A to C

| | Compression Set, Maximum Value in % in the Temperature Range from 20° to 70° C. (DIN 53,572)* | Tensile Strength [N/mm²] (DIN 53,571) | Elongation at Break [%] (DIN 53,571) | Compression Resistance C** [N] (DIN 53,576) |
|---|---|---|---|---|
| 1 | 5.4 | 0.15 | 200 | 305 |
| A | 11.0 | 0.15 | 200 | 305 |
| B | 10.7 | 0.16 | 200 | 320 |
| C | 6.0 | 0.10 | 155 | 320 |

*After a storage period of 22 hours in compressed condition.
**Indentation hardness with identical foam densities of the latex foams.

Test specimens A and B show unsatisfactory values for compression set. Test specimen C has inadequate data for tensile strength and for elongation at break.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A styrene/butadiene graft copolymer latex wherein: the graft copolymer is characterized by the following features:
    a. it is obtained by a semicontinuous emulsion feed polymerization process in the presence of 1-6% by weight of a conventional fat soap and/or resin soap as the emulsifier and ≦0.3% by weight of a conventional compound regulating the molecular weight of the polymer, based in each case on the entire amount of all monomers used to prepare the latex;
    b. The graft copolymer (A) comprises 35-65% by weight of a graft substrate (A1) which, in turn comprises a graft substrate (B1) and a grafted-on proportion (B2), and 35-65% by weight of a grafted-on proportion A2;
    c. (A1) is obtained in two stages; in the first stage, a polystyrene nucleating latex (B1) is obtained having a solids content of 1-20% by weight based on the final amount of (A); in the second stage (B2) is grated onto (B1) and comprises 86-95% by weight of styrene units and 5-14% by weight of 1,3 butadiene units; intensive agitation is performed while feeding the emulsifier during the grafting process in order to avoid formation of new particles and in this stage the styrene and butadiene monomers, the emulsifier and an initiator are dosed simultaneously;
    d. (A2) (grafted on in the last stage) comprises 62-70% by weight of styrene units and 30-38% by weight of 1,3-butadiene units; intensive agitation is carried out while feeding the emulsifier during the grafting process in order to avoid formation of new particles and the styrene and butadiene monomers, the emulsifier and an initiator are dosed simultaneously;
    e. (A) is present in the disperse phase of the latex; the latter comprising particles of an average diameter of 120-300 nm, as determined by surface titration (soap titration), having more rigid central regions due to a higher styrene content and less rigid outer regions due to lesser styrene content.

2. A latex of claim 1, wherein said amount of (B1) recited in (c) is 5-15% by weight.

3. A latex of claim 1, wherein (A1) and (B2) recited in (c) comprise 87-93% by weight of styrene units and 7-13% by weight of 1,3-butadiene units; and wherein (A2) recited in (d) comprises 65-69% by weight of styrene units and 31-35% by weight of 1,3-butadiene units.

4. A latex of claim 1, wherein said average particle diameter recited in (e) is 150-250 nm.

* * * * *